United States Patent
Zalevsky (10) Patent No.: US 8,169,695 B2
(45) Date of Patent: May 1, 2012

(54) OPTICAL SUB-WAVELENGTH SUPER RESOLUTION IMAGING SYSTEM PRODUCING NANOMETRIC SPATIAL RESOLUTION OF A SCANNED SUBJECT

(75) Inventor: Zeev Zalevsky, Rosh HaAyin (IL)

(73) Assignee: Xceed Imaging Ltd., Rosh Haayin (IL)

( * ) Notice: Subject to any disclaimer, the term of this patent is extended or adjusted under 35 U.S.C. 154(b) by 841 days.

(21) Appl. No.: 12/267,799

(22) Filed: Nov. 10, 2008

(65) Prior Publication Data

US 2009/0122299 A1 May 14, 2009

Related U.S. Application Data

(63) Continuation of application No. PCT/IL2007/000559, filed on May 9, 2007.

(60) Provisional application No. 60/798,747, filed on May 9, 2006.

(51) Int. Cl.
*G02B 21/00* (2006.01)

(52) U.S. Cl. ........ 359/380; 359/368; 359/371; 359/389; 436/171

(58) Field of Classification Search .................. 359/368, 359/371, 380, 389; 436/171, 518, 172; 250/201.9; 356/445; 385/125; 514/260.1
See application file for complete search history.

(56) References Cited

U.S. PATENT DOCUMENTS

| | | | |
|---|---|---|---|
| 5,018,865 A | 5/1991 | Ferrell et al. | |
| 5,633,972 A | 5/1997 | Walt et al. | |
| 6,590,194 B2 | 7/2003 | Sardana et al. | |
| 2001/0002315 A1 * | 5/2001 | Schultz et al. | 436/172 |
| 2001/0055764 A1 | 12/2001 | Empedocles et al. | |
| 2003/0180966 A1 * | 9/2003 | Abbott et al. | 436/518 |
| 2005/0059681 A1 * | 3/2005 | Cremer et al. | 514/260.1 |
| 2006/0257089 A1 * | 11/2006 | Mueth et al. | 385/125 |
| 2007/0013999 A1 * | 1/2007 | Marks et al. | 359/368 |
| 2007/0229835 A1 * | 10/2007 | Smolyaninov et al. | 356/445 |
| 2008/0265130 A1 * | 10/2008 | Colomb et al. | 250/201.9 |

OTHER PUBLICATIONS

International Search Report and Written Opinion, mailed Jul. 29, 2008, from International Application No. PCT/IL07/00559, filed May 9, 2007.

Bozhevolnyi, S. I. et al., "Self-consistent model for photon scanning tunneling microscopy: implications for image formation and light scattering near a phase-conjugating mirror," J. Opt. Soc. Am. A, vol. 13, No. 12, pp. 2381-2392 (1996).

Di Francia, G. T., "Degrees of freedom of an image," J. Opt. Soc. Am., vol. 59, No. 7, pp. 799-804 (1969).

Kakarantzas, G. et al., "Miniature all-fiber devices based on CO2 laser microstructuring of tapered fibers," Opt. Let., vol. 26, No. 15, pp. 1137-1139 (2001).

Lukosz, W., "Optical systems with resolving powers exceeding the classical limit, II" J. Opt. Soc. Am, vol. 57, No. 7, pp. 932-941 (1976).

(Continued)

*Primary Examiner* — Le Luu (74) *Attorney, Agent, or Firm* — Houston Eliseeva, LLP (57) ABSTRACT

An imaging method and system are presented for use in sub-wavelength super resolution imaging of a subject. The imaging system comprises a spatial coding unit configured for collecting light coming from the scanned subject and being spaced from the subject a distance smaller than a wavelength range of said light; a light detection unit located upstream of the spatial coding unit with respect to light propagation from the object, and configured to define a pixel array and a spatial decoding unit, which is associated with said pixel array and is configured for applying spatial decoding to a magnified image of the scanned subject, thereby producing nanometric spatial resolution of the image.

55 Claims, 5 Drawing Sheets

OTHER PUBLICATIONS

Pedrini, G. et al., "Short-coherence digital microscopy by use of a lensless holographic imaging system," Appl. Opt., vol. 41, No. 22, pp. 4489-4496 (2002).

Schilling, B. W. et al., "Three dimensional halographic fluorescence microscopy," Opt. Let., vol. 22, No. 19, pp. 1506-1508 (1997).

Török, P. et al., "Effect of half-stop lateral misalignment on imaging of dark-field and stereoscopic confocal micsoscopes," Appl. Opt. vol. 35, No. 34, pp. 6732-6739 (1996).

Zalevsky, Z. et al., "Photonic crystal in-fiber devices," Optical Engineering, vol. 44 (12), 125003, Dec. 2005.

* cited by examiner

OPTICAL SUB-WAVELENGTH SUPER RESOLUTION IMAGING SYSTEM PRODUCING NANOMETRIC SPATIAL RESOLUTION OF A SCANNED SUBJECT

RELATED APPLICATIONS

This application is a Continuation of PCT application serial number PCT/IL2007/000559 filed on May 9, 2007, which claims the benefit under 35 USC 119(e) of U.S. Provisional Application No. 60/798,747, filed on May 9, 2006, both of which are incorporated herein by reference in their entirety.

FIELD OF THE INVENTION

This invention is generally in the field of imaging techniques, and relates to optical sub wavelength super resolution imaging system and method, which may be used in various applications.

BACKGROUND OF THE INVENTION

The resolution of a lens-based imaging system is defined by the finite dimensions of a lens. The resolving power or the minimum separation between two points which can be resolved is limited by the diffraction that takes place in the imaging system (e.g. microscope) because of the wave nature of light. Moreover, it should be noted that the resolution limit arises from the assumption that the image of an object is being detected in the "Far-Field", that is, at a distance which is much greater than the wavelength of light employed. For these reasons, where the optical microscopy is so limited in resolution to no better than one-half of the wavelength of light being used, such microscopy is termed "far-field" imaging or viewing. An alternative to conventional lens-based optical microscopy is the "near-field" or lens less technique which provides super resolution imaging and spectroscopy. The term "super resolution" refers to spatial resolution which exceeds the diffraction limitation caused by the wave nature of light, and signifies a resolution which is greater than one-half the wavelength of the light actually being used. Super resolution near-field imaging and near-field scanning optical microscopy ("NSOM") is based on the fact that although light cannot be focused to a spot less than one-half the wavelength of light, it can be directed through a device or article which reduces the size of the light energy to dimensions smaller than one-half the wavelength of light.

Despite the many recent developments and innovations reported in the scientific literature, near-field imaging and near-field scanning optical microscopy remains a difficult and burdensome technique in practice. The aperture device for producing sub wavelength light energy yields only a single beam of light, requires careful positioning of the single beam of light in a carefully controlled fixed relationship to the surface of an object to be imaged, and provides images which are extremely limited in the size of the field of view as well as the quality of the image actually seen. Moreover, to employ the NSOM technique, a long period of carefully controlled raster scanning must be performed using only the single beam of light which must then travel repeatedly over large areas of sample to provide even a single image. Thus, present practical techniques of NSOM and near-field imaging as such are highly laborious, time consuming, technically stringent and demanding, and provide only single points of information which then must be carefully matched with many other individual points in order to obtain a comprehensive picture of the sample which then may be reviewed for micro analytical purposes.

U.S. Pat. No. 5,633,972 describes a super resolution imaging fiber for sub wavelength light energy generation and near-field optical microscopy. The imaging fiber comprises a unitary fiber optical array of fixed configuration and dimensions comprising typically from 1,000 to 100,000 optical fiber strands which terminate at one array end as tapered strand end faces limited in size to a range from about 2-1,000 nanometers in diameter. Overlying these tapered strand end faces is a thin opaque metal coating having a size-limited end aperture ranging from about 2 to less than about 1,000 nanometers in diameter. These size-limited end apertures collect the evanescent light scattered from the surface of the object and transfer the energy to an output detector. That way a generation of a plurality of discrete sub wavelength light beams is concurrently generated.

The basis of operation of a second type of NSOM, the conventional scanning tunneling optical microscope (STOM), also known under the name photon scanning tunneling microscope (PSTM), as described for example in the U.S. Pat. No. 5,018,865 is the sample-modulated tunneling of normally internally reflected photons to a sharply pointed optically transparent tip. The source of the photons is the evanescent field produced by the total internal reflection of a light beam from the sample surface.

An internal reflection is caused by placing the sample surface at the hypotenuse face of a total-reflection prism. The light beam enters perpendicular to one of the side faces of the prism to be totally reflected by the hypotenuse face. The spatial variations in the evanescent field intensity form the basis for imaging. They essentially provide an exponentially decaying waveform normal to the sample surface. Photons tunneling from the total internal reflection surface to the tip are guided to a suitable detector which converts the light flux to an electrical signal. The PSTM detects a signal only when the tip is placed within the decay length of the evanescent wave, allowing an accurate distance control.

The main problem is that details having smaller dimension produce evanescent rather than harmonic waves and they do not propagate in space without attenuation. One interesting approach that allows seeing those details is related to the near field tunneling microscope in which a pipette with core which is less than the wavelength is attached to the sample and causes tunneling of the evanescent waves into the pipette [S. I. Bozhevolnyi, B. Vohnsen, E. A. Bozhevolnaya and S. Berntsen, "Self-consistent model for photon scanning tunneling microscopy: implications for image formation and light scattering near a phase-conjugating mirror," JOSA A, Vol. 13, 2381 (1996)]. After guiding them to the detector they can be observed. Every readout of the detector corresponds to a single spatial sampling point. In order to map the entire sample, scanning is required. In order to have sufficient energy, the pipette must be very close to the surface of the sample, i.e. at a distance which is much smaller than the optical wavelength. The main problem with this approach is that covering large area consumes a lot of time.

Another shortcoming of the PSTM relates to the illumination of the sample: In contrast to the a-SNOM, the whole sample is irradiated throughout the total measuring time. Thus, the probability of damage through heating or other effects of the light is increased. Further, the PSTM shows an inferior lateral resolution compared to a SNOM, due to the use of a transparent optical probe tip. One way of improving this resolution is to cover the tip of a PSTM with an opaque material leaving only a tiny aperture to collect the light from a well-defined spot of the sample. However this is at the cost of the detected light intensity.

SUMMARY OF THE INVENTION

There is a need in the art to provide an imaging technique enabling sub-wavelength super resolution imaging of the details of a subject. The technique disclosed herein solves this problem by utilizing a spatial coding of light coming from the scanned subject (e.g. moving subject and/or moving spatial coder) at a distance close to the subject, magnifying the spatially coded image, and applying spatial decoding to the magnified coded image substantially in an imaging plane. The spatial coding is implemented by collecting light from the subject by a pattern of spaced-apart light transmitting regions containing sub wavelength features.

Thus, according to one broad aspect of the invention, there is provided an imaging system for use in sub-wavelength super resolution imaging of a subject, the system comprising:

a spatial coding unit configured for collecting light coming from the scanned subject and being spaced from the subject a distance smaller than a wavelength range of said light;

a light detection unit located upstream of the spatial coding unit with respect to light propagation from the object, and configured to define a pixel array and a spatial decoding unit, which is associated with said pixel array and is configured for applying spatial decoding to a magnified image of the scanned subject, thereby producing nanometric spatial resolution of the image.

The system is configured to provide certain magnification of the coded image of the subject. In some embodiments of the invention, this is implemented using an imaging lens unit at the output of the spatial coding unit. In some other embodiments, the desired magnification is achieved, alternatively or additionally to the use of the imaging lens, by configuring the coding unit to provide at least partial image magnification.

The spatial coding unit is a patterned structure, with the pattern being in the form of an array of spaced-apart light transmitting regions. In some embodiments of the invention, the spatial coding unit comprises a fiber bundle formed by an array of light collecting fibers defining the array of spaced-apart light transmitting regions. As indicated above, the spatial coding unit may be configured to image the subject with a predetermined magnification. This can be achieved by making the light transmitting region defined by each of the light collecting fibers with a cross sectional dimension increasing from a distal end of the fiber by which it is brought to the subject towards a proximal end thereof. The cross sectional dimension of the transmitting region at the distal end of the fiber may be in a range from about few nanometers to a few hundreds of nanometers.

The decoding unit may also be in the form of a fiber bundle including an array of fibers extending by their proximal output ends towards the pixel array arrangement. The proximal output end of the decoding fiber bundle defines a decoding pattern in the form of spaced-apart light transmitting regions.

The pattern of the decoding unit presents the pattern of the coding unit at its distal end multiplied by the required image magnification. The pattern of the coding unit is a two- or three-dimensional pattern. Each of said coding and decoding units may be configured to concurrently generate a plurality of discrete light beams originated from the spaced-apart light transmitting regions spaced from one another a sub wave length distance, thereby enabling formation of an image including a plurality of spatial sampling points. By this, the scanning time of the subject is reduced by a factor proportional to the number of the spaced-apart light transmitting regions.

In some embodiments of the invention an imaging lens unit configured to provide certain magnification of a spatially coded image of the subject is located between the coding and decoding fiber bundles, with or without gap(s) between the imaging lens and the fiber bundle(s) for free space light propagation through the gap(s). For example, the imaging lens unit may be attached to the proximal end of the coding fiber bundle, and the decoding fiber bundle extends from the imaging lens towards the pixel array arrangement. The pattern in the form of an array of spaced-apart light transmitting regions at the pixel array arrangement is configured in accordance with the image magnification.

The imaging of the scanned subject is provided by imaging the subject during a relative displacement between the coding and decoding units and the subject along an axis substantially perpendicular to an optical axis of the light propagation through the system.

The coding and decoding units may be defined by input and output arrays of optical fibers, respectively. These input and output fiber arrays may be spaced from each other in a manner allowing a free space light propagation from the input to the output fibers. The input and output fiber arrays may be constituted by input and output ends of the same fiber bundle.

Preferably, the coding unit is in the form of a tapered fiber bundle defining a three-dimensional array of light transmitting regions. The tapered fiber bundle preferably has a nano- or subnanoscale dimension at its distal end. The fibers of the coding unit may include illuminating and light collecting fibers. Spatial separation between the illuminating and collected light can be implemented via appropriate polarization. The input fibers are arranged to form the pattern of the spatial coding unit, and the output fibers are arranged to form the pattern of the spatial decoding unit. In some other embodiments, the illuminating and light collecting fibers are arranged such that the arrangement of fibers at the distal end corresponds to the pattern of the spatial coding unit, and the arrangement of fibers at the proximal end forms the pattern of the decoding unit. A distance between two cores of adjacent fibers substantially does not exceed the wavelength of the light used in the system.

Generally, the spatial coding unit is configured to couple evanescent waves produced by reflection of illuminating light beams from the subject, and to allow the reflected light beams propagation therethrough towards the detection unit. As the coding fiber array has small details of few nanometers at its distal end (due to the appropriate dimensions and arrangement of these fibers), the evanescent details become harmonic again. The decoding unit is configured and operable to produce a super-resolved image by performing digital processing on a temporal sequence of images collected from the subject.

In some embodiments of the invention, the decoding unit is configured as a digital mask at the output of the pixel array. Such decoding unit is configured and operable to perform processing of the output of the pixel array, by applying certain spatial decoding to digital representation of each image in a sequence of successively acquired images during a certain period of time, obtaining digital coded data for each of the images, and integrating said coded data for said sequence of images.

The above described system is preferably used for imaging moving subjects, utilizing stationary mounted coding and decoding units.

The system is associated with a processor unit connectable to the output of the light detection unit and configured for processing data indicative of the image collected from the scanned subject and generating data indicative of the sub-wavelength features of the subject.

In some embodiments, the coding unit is configured as a pipette, for example pipette configured for penetrating through subject's tissue.

According to another broad aspect of the invention, there is provided a system for use in determination of one or more blood related parameters of a subject, the system comprising:

an optical imaging unit configured for illuminating the blood stream and for producing sub-wavelength super resolution imaging of the flowing blood, and a processor unit configured and operable for processing the sub-wavelength super resolution image and outputting data indicative of said one or more blood related parameters.

In some embodiments of the invention, the imaging unit comprises:

a spatial coding unit configured for collecting light coming from the flowing blood and being spaced from the blood vessel a distance smaller than a wavelength range of said light;

an imaging lens unit configured to produce a predetermined magnification of the spatially coded image of the flowing blood; and a light detection unit configured to define a pixel array and a spatial decoding unit, which is associated with said pixel array and is configured for applying spatial decoding to the magnified image of the flowing blood, thereby producing nanometric spatial resolution of the image.

The system is associated with a processor unit configured and operable for calculating molecules of a certain substance of blood in the scanned subject and determining concentration of said substance in the subject's blood.

According to yet another aspect of the present invention there is provided an imaging method for sub-wavelength super resolution imaging of a subject, the method comprising:

while collecting light from the scanned subject, applying to said light a spatial coding at a distance from the subject smaller than a wavelength range of said light, such that the collection of the light is obtained due to tunneling of evanescent waves;

creating a sequence of magnified images of the subject from said collected coded light;

applying spatial decoding to signal indicative of the magnified coded image; and, processing digital data indicative of the spatially decoded light and generating data indicative of a nanometric spatial resolution image of the subject.

The method also comprises generating from light coming from the subject a plurality of discrete light beams originated from the spatial coding unit, thereby enabling formation of an image including a plurality of spatial sampling points.

According to yet further aspect of the invention, there is provided a method for use in determination of one or more blood related parameters of a subject, the method comprising:

producing an optical sub-wavelength super resolution image of the scanned subject, and processing the sub-wavelength super resolution image and outputting data indicative of said one or more blood related parameters.

The method also comprises:

while collecting light coming from a blood vessel, applying to said light a spatial coding at a distance from the blood vessel smaller than a wavelength range of said light such that the collection of the light is obtained due to tunneling of evanescent waves;

creating a magnified image of the sub-wavelength features of the blood stream from said collected coded light;

while detecting light indicative of the magnified image, applying to the detected light spatial decoding; and, processing digital data indicative of the spatially coded light and generating data indicative of a nanometric spatial resolution image of the blood stream.

The blood related parameters comprise chemical components such as glucose within the blood stream. The method comprises identifying and counting glucose molecules.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The present invention is concerned generally with the imaging systems, such as optical instruments and microscopes, that bypass the limitation of lens-based optical microscopy which is limited in resolution to no better than one-half of the wavelength of the light being used. More specifically, the technique disclosed in the present application is directed to the development of near-field imaging fibers which allow optical imaging and the examination of subjects without being limited by the diffraction properties of electromagnetic radiation.

Figure 1A:
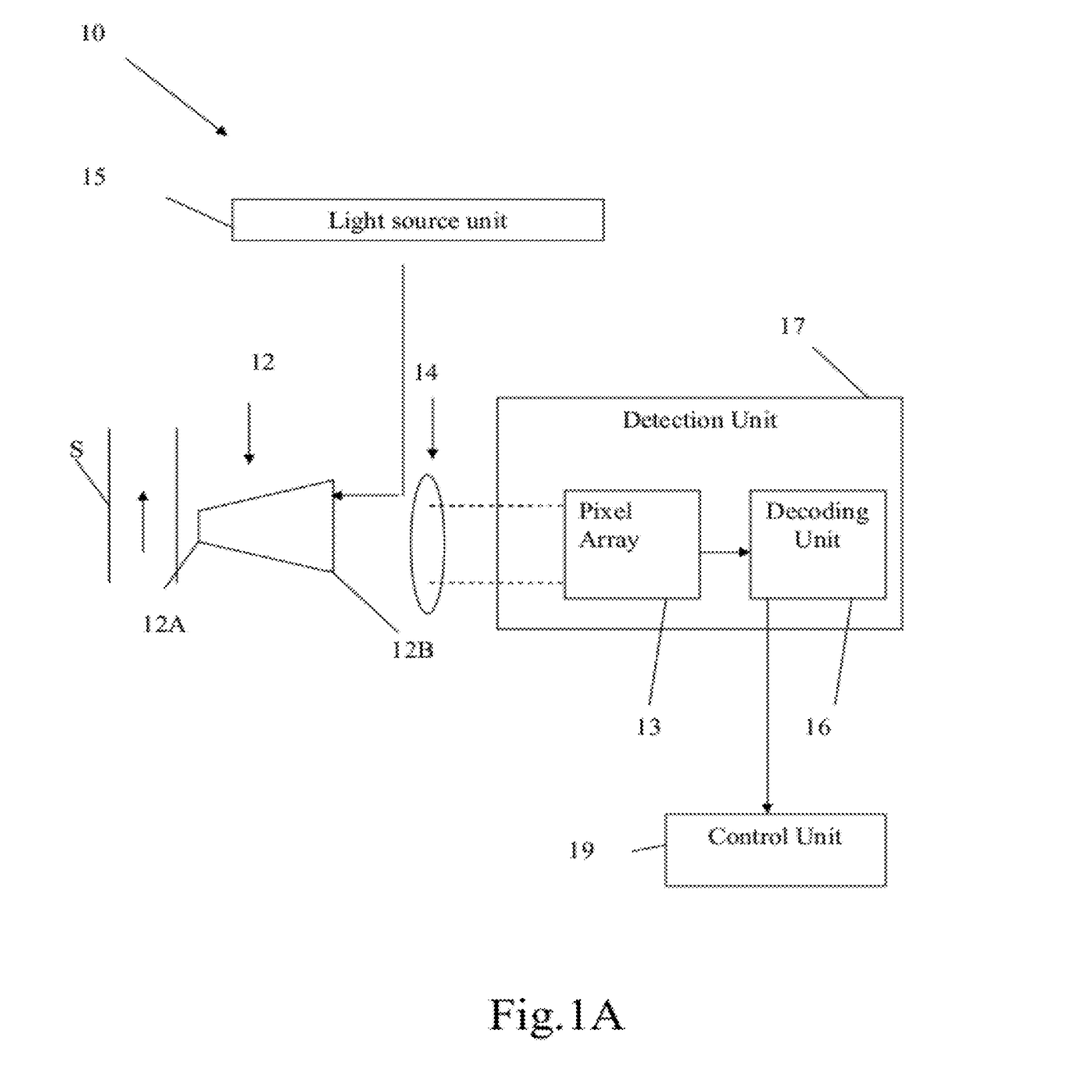
FIGS. 1A and 1B schematically illustrate two examples, respectively of an imaging system for use in sub-wavelength super resolution imaging of a subject.

Reference is made to FIG. 1A exemplifying an imaging system, generally designated 10, for use in sub-wavelength super resolution imaging of a subject S. In the present specific but not limiting example, the subject being images is blood flowing in the subject's blood vessel. The imaging system may for example be used for determination of one or more blood related parameters, such as concentration of a substance (e.g. glucose) in blood.

The imaging system includes a spatial coding unit 12 configured for collecting light coming from the scanned subject S, a magnification optics 14 (including one or more imaging lenses of appropriate magnification), and a decoding unit 16 associated with a light detection unit 17. The system 10 is associated with a light source unit 15, which may be a constructional part of the system 10 or may be an external unit appropriately optically coupled to the inside of the system 10. The detection unit 17 includes inter alia a pixel array arrangement 13. The output of the detection unit is connectable to a control unit 19. The latter is configured for receiving and analyzing data coming from the detection unit and generating output data indicative of the image of a region of interest in the subject and/or of the blood parameter(s) calculated from the image data.

Generally, the spatial coding unit 12 is configured as a 2D or 3D pattern (mask) of spaced-apart light transmitting regions, such as light guiding channels and is spaced from the subject S a distance smaller than a wavelength range of light passing therethrough. The spatial coding unit 12 may be configured as both illuminator and light collector. The imaging system thus projects certain patterns (e.g. periodic patterns) on top of the subject which are then investigated under a microscope like imager.

The system is configured for imaging scanned subjects, which in the present examples of determining the parameters(s) of blood is achieved due to the blood flow with respect to the system. Alternatively or additionally, the spatial coding unit could be movable with respect to the subject along an axis substantially perpendicular to the optical axis of the system.

Preferably, the spatial coding unit 12 is configured as a fiber bundle. Such a fiber based spatial coding unit may be configured as a multi-core pipette fabricated as a taper, having a cross section similar in its structure to photonic crystal fibers (PCF). In general, such fibers have a cross-section (normally uniform along the fiber length) microstructured from two or more materials, most commonly arranged periodically over much of the cross-section, usually as a "cladding" surrounding a core (or several cores) where light is confined.

The cross section of the taper may contain many sub wavelength light guiding channels even in the nanometric scale, used to couple the evanescent waves produced by the total internal reflection of a light beam from the subject, and to guide them to the light detection array. Since the cross section of the tapers is several microns in diameter and it may contain hundreds of light guiding channels, the scanning time is significantly reduced; the reduction factor is proportional to the number of the channels.

The fiber based coding unit 12 includes a plurality of illuminating and light collecting fibers. As indicated above the illuminating and collected light can be separated using polarization based approach. The tapered structure of the fiber bundle (cross sectional dimension increasing from the distal end 12A to the proximal end 12B of the fiber bundle) is selected to provide a certain magnification of an image of the subject.

The imaging lens unit 14 is mounted upstream of the coding unit 12 with respect to a direction of light propagation through the system, and is configured to provide a further magnified image of the subject. The magnification lens 14 may for example be attached to the proximal end 12B of the fiber bundle 12.

Light passing through the magnification lens 14 propagates towards the detection unit 17. This may be free space propagation, or through a light guide, e.g. another fiber bundle as shown in the figure by dashed lines.

The light detection unit 17 is configured to define the pixel array arrangement 13 and spatial decoding unit 16 associated with the pixel array arrangement. The spatial decoding unit 16 is configured for decoding the magnified image of the subject under scanning in accordance with the coding introduced by the spatial coding unit 12 and image magnification applied during the light propagation to the detection unit, thereby producing nanometric spatial resolution of the image. This will be described more specifically further below.

The decoding unit 16 may be configured as a physical element in the form of a patterned surface (mask), or as a software utility or so-called "digital mask". In the example of FIG. 1A, the use of digital mask is shown, where the decoding software utility received digital representation of the electrical output of the pixel array arrangement. It should be understood, although not specifically shown, that the output of the pixel array is digitized and possibly also amplified before it undergoes decoding by utility 16.

Thus, in the example of FIG. 1A, the coding unit is a tapered fiber bundle including illuminating fibers and light collecting fibers. The latter couple the evanescent waves produced by reflection of illuminating light beams from the subject. Due to the tapered configuration of the coding unit, it is operable to magnify the collected image by, for example, 20. Practically, the coding unit is configured to magnify the collected image to ease the requirements of the imaging lens unit. The coding unit is also used as a coding mask configured and operable to perform super resolved imaging over moving subjects. The imaging lens unit is configured to image the scanned subject with a predetermined magnification of for example 60 in order to adapt the super resolved image due to diffraction and to the geometrical resolution of the detector's pixels. The image propagates then in a free-space light propagating region towards the light detection unit. The decoding unit is in the form of a software utility connectable to the output of the pixel array arrangement.

Figure 1B:
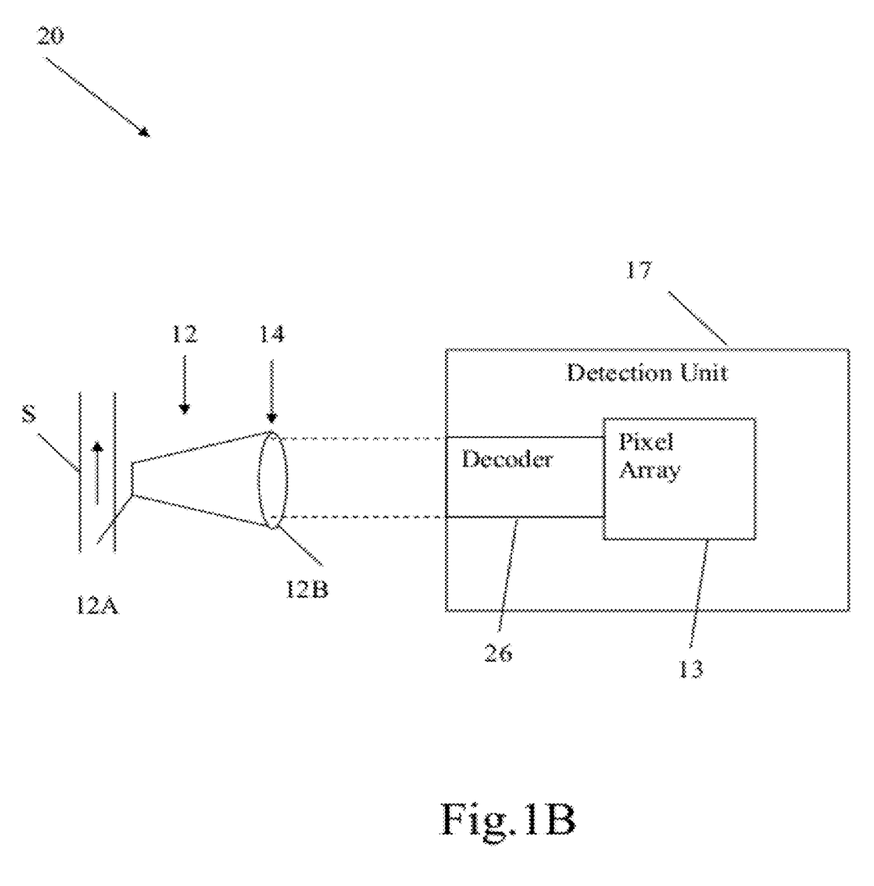

Reference is made to FIG. 1B showing another example of an imaging system, generally at 20. To facilitate understanding, the same reference numbers are used for identifying components that are common in the examples of the invented system. The system 20 includes a spatial coding unit 12 in the form of a tapered fiber bundle which by its distal end 12A is brought close to the subject, an imaging and magnifying lens unit 14 attached to the proximal end 12B of the fiber bundle, and a detection unit 17 including a pixel array arrangement 13 and a decoding unit 26. In the present example, the decoding unit 26 is a physical element defining a patterned surface, in which the pattern presents a magnified image of the pattern at the distal end 12A of the coding unit 12, with a magnification factor being defined by the image magnification introduced by the light propagation through the coding unit 12 and that of the lens unit 14. Such a patterned surface 26 is located upstream of the pixel array close thereto, practically being in the imaging plane and is defined by the butt end of a fiber bundle by which it faces the pixel array. This output bundle 26 may extend from the imaging lens 14 or may be spaced therefrom thereby defining free space propagation for light passed through the lens 14 towards the decoding unit 26.

It should be noted although not specifically shown that according to yet another example, the coding and decoding units may be constituted by the patterned surfaces at the distal and proximate ends of the fiber bundle extending from the object to the pixel array. Such a fiber bundle will have an increasing cross-sectional dimension (increasing diameters of the light collecting fibers) towards the proximal end according to the required image magnification.

Figure 1C:
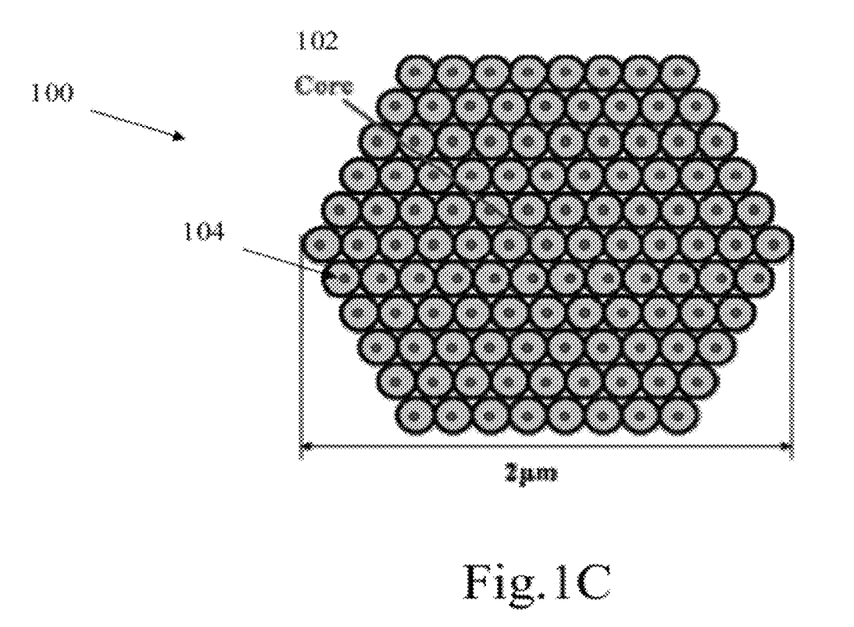
FIG. 1C schematically illustrates a cross-section view of an example of a fiber based coding unit suitable to be used in the systems of FIGS. 1A and 1B.

Reference is made to FIG. 1C illustrating the cross section of a fiber based coding (or decoding) unit 100. The coding unit 100 is a fiber bundle including an array of fibers, each including a core 102 enclosing a light transmitting region 104. The maximal cross-sectional dimension of the fiber bundle is of a few microns (e.g. 2 microns). The light transmitting region has a diameter much smaller than the distance between the centers of two adjacent cores, which means that the duty cycle of the super resolving coding/decoding function is low. This improves significantly the quality of the super resolved image. In other words, the coding/decoding unit introduces many orders of diffraction due to the above described arrangement of light transmitting regions and due to the relative movement between the subject and coding unit, thus allowing collection by the coding unit a sequence of a high number of light components incident onto the coding unit with different angles of incidence. As a result, the coding/ decoding unit has many high order spectral harmonics which are responsible for the resolution improvement after the time averaging operation.

Thus, the disclosed technique allows for obtaining images exceeding the geometrical limitation of the detector array of the imaging camera. Moreover, when low intensity images are examined and the geometrical resolution of the light detection unit is sufficiently high, the imaging method can be used on binned images thereby enabling the original resolution to be recovered while the signal to noise ratio is significantly enhanced.

The disclosed technique is adapted for use in fluorescence imaging allowing to overcome the problem of low emission intensity.

The coding/decoding pattern may be periodic or random. The random pattern may be a speckle pattern, achieved by using a light diffusive surface as a coding unit (12 in FIGS. 1A and 1B), and using either a second diffusive surface as a decoding unit (26 in FIG. 1B) in front of the pixel array or a digital decoder (16 in FIG. 1A) at the output of the pixel array. The imaging system thus projects a random speckle pattern onto a subject, which projection (image) is observed through a microscope. The projection of the speckle pattern is created by coherent illumination of the inspected pattern (features of the subject) through a diffuser (coding unit). Due to local interference of the coherent wavefront with itself, a random speckle pattern is superimposed on the subject. This speckle pattern can be scanned over the subject (e.g. due to the subject's movement).

A super-resolved image can be extracted from a temporal sequence of images by appropriate digital processing of the image stream. The resulting resolution is significantly higher than the diffraction limitation of the microscope objective.

The fiber based coding unit may be fabricated using 40 W $CO_2$ laser and controlled stages/motors [G. Kakarantzas, T. E. Dimmick, T. A. Birks, R. Le Roux, P. St. J. Russell, "Miniature all-fiber devices based on CO2 laser micro-structuring of tapered fibers," Opt. Let. 26, 1137 (2001)]

Figure 2:
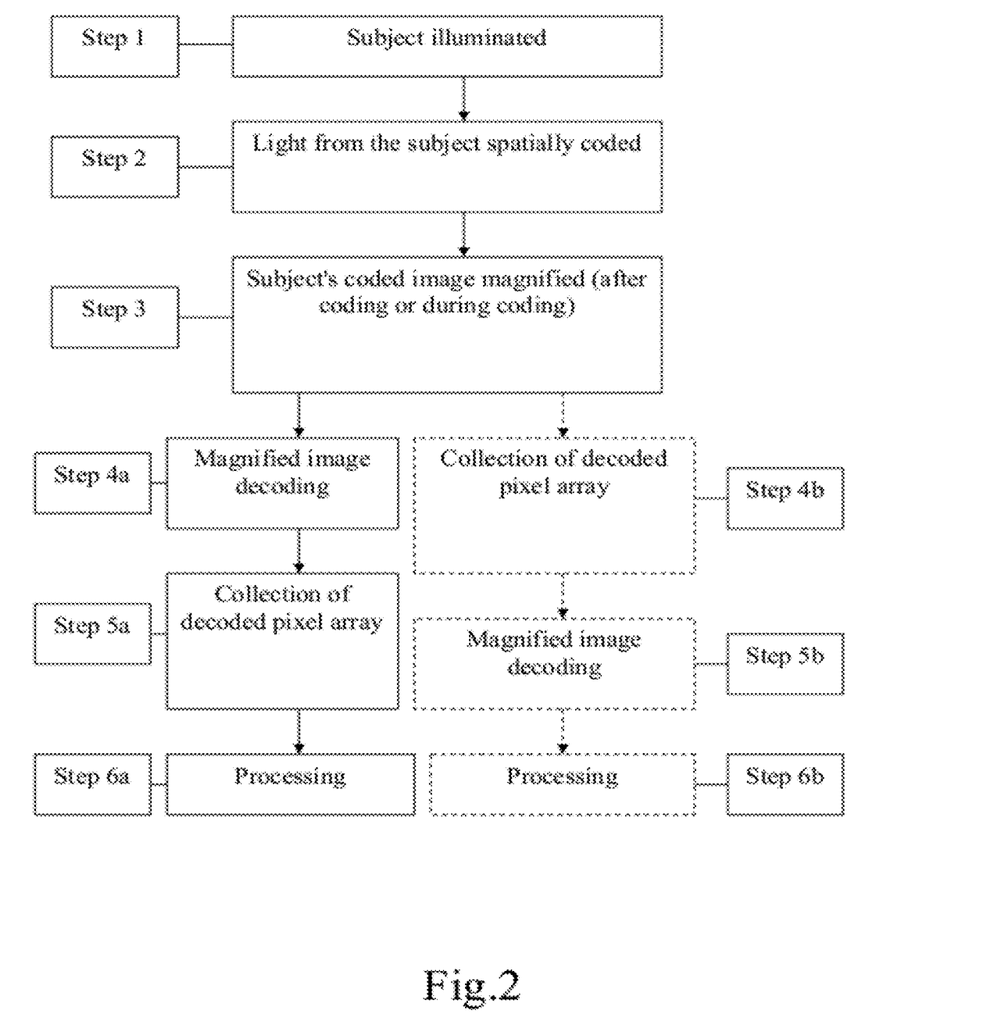
FIG. 2 is a flow chart of an example of a method according to the invention for sub-wavelength super resolution imaging of a subject.

Reference is made to FIG. 2, illustrating a flow chart of an example of a method according to the invention for sub-wavelength super resolution imaging of a subject.

Initially, the scanned subject is illuminated (Step 1) either by an external illumination (e.g. ambient light) or by an optical imaging unit (e.g. via illuminating fibers in the fiber bundle coding unit).

The light emitted from the subject is collected and spatially coded by passing it through the coding unit (Step 2). Thus, a sequence of successively collected and coded images of the subject is obtained during a certain period of time.

The image in the form of spatially coded light is magnified either by using an imaging lens unit at the output of the spatial coding unit and/or by configuring the coding unit to provide image magnification as described above (Step 3).

According to some embodiments, a spatial decoding (Step 4a) is applied to each magnified coded image and the decoded image is projected onto a light detection unit, i.e. onto the pixel array (Step 5a), and a digital decoded data is obtained for each image. The decoding is enables due to the fact that the decoding mask presents a magnified image of the coding mask and the same relative displacement exists between the decoding mask and the subject.

The digital data representative of the spatially decoded light is processed (6a). Data indicative of sub wavelength features of the subject is generated based on the temporal sequence images. The processing includes integrating the image data for the sequence of images by time averaging.

Alternatively, as shown in the figure in dashed lines, after the magnification of the coded light, the coded light is imaged onto a light detection unit (Step 4b), and spatial decoding (Step 5b) is applied to digital representation of the detector output (i.e. magnified coded images). The digital data representative of the spatially decoded images is processed (6b). Data indicative of sub wavelength features of the subject is generated based on the temporal sequence images. The processing includes integrating the coded data for the sequence of images by time averaging.

For example, the processing is aimed for determining glucose concentration within the blood stream of a subject. In this case, processing includes identification of glucose molecules in a sequence of images using the database of the molecules (the glucose molecules have round shape and diameter of around 1 nm); counting the glucose molecules in the imaged blood stream assuming that the blood stream has more or less constant flowing speed; and determining the concentration of the glucose molecules. It should be noted that observing in the images of molecules passing about 1 micron away from the coding unit (from the distal end of the fiber based coding unit) might not be effective for counting those molecules. However, as the glucose molecules are uniformly distributed in the cross section of the blood stream in a blood vessel and between various blood vessels, by counting the number of molecules at a range of up to about 10 nm away from the edge of the fiber and by knowing the diameter of the blood vessel, the glucose concentration can be estimated.

Super resolution can be achieved by moving periodic coding functions close to the surface of an observed subject or vice versa. The coding function can be a grating or a random pattern. The following is determining the PSF (point spread function) of such a configuration and its affect for decoding sub wavelength features. To compute the PSF, a delta size detail is observed:

$$f(x)=\delta(x)$$

Such detail is multiplied by the transmission function of a grating g allocated close to the subject:

$$\delta(x)g(x-x_1)=g(-x_1)\delta(x)$$

Imaging through system with such PSF is expressed as:

$$g(-x_1)\delta(x)\otimes PSF(x)=g(-x_1)PSF(x)$$

After multiplying by the same decoding grating (conjugated for completeness), we have:

$$g(-x_1)PSF(x)g^*(x-x_1)$$

Now, this is added for all displacements (indeed only 1 period is enough):

$$PSF_{total}(x)=\int g(-x_1)PSF(x)g(x-x_1)dx_1=\\PSF(x)\int g(x_1)g(x+x_1)dx_1=\gamma_g(x)PSF(x)$$

So, the PSF of the process is the product of the PSF of the original system multiplied by the autocorrelation of the grating g. This autocorrelation can be spatially very narrow function and therefore the total PSF can be much narrower than the original one. For instance, for a binary grating with a period P and Fill factor w) we have:

$$g(x) = \left(\sum_k \delta(x-kP)\right) \otimes rect\left(\frac{x}{P} \times w\right) = comb\left(\frac{x}{P}\right) \otimes rect\left(\frac{x}{P} \times w\right)$$

The autocorrelation is:

$$\gamma_g(x) = comb\left(\frac{x}{P}\right) \otimes Triang\left(\frac{x}{P} \times w\right)$$

Then, the full PSF is:

$$PSF_{total}(x) = \gamma_g(x) PSF(x) = PSF(x)\left[comb\left(\frac{x}{P}\right) \otimes Triang\left(\frac{x}{P} \times w\right)\right]$$

Indeed a much narrow total PSF is obtained. Its width is proportional to the smallest feature of the coding/decoding grating. If the coding grating has sub wavelength features and the object has relative movement in relation to this grating then after the decoding process, a sub wavelength image may be extracted. Obviously this is conditioned that the magnification factor of the imaging system is sufficient such that the sub wavelength features in the object plane indeed can be sampled by the pixels of the detectors without loss of resolution, i.e. the resolution limit is imposed by the diffraction rather than by the size of the pixels in the detector (geometrical resolution limit).

Figure 3:
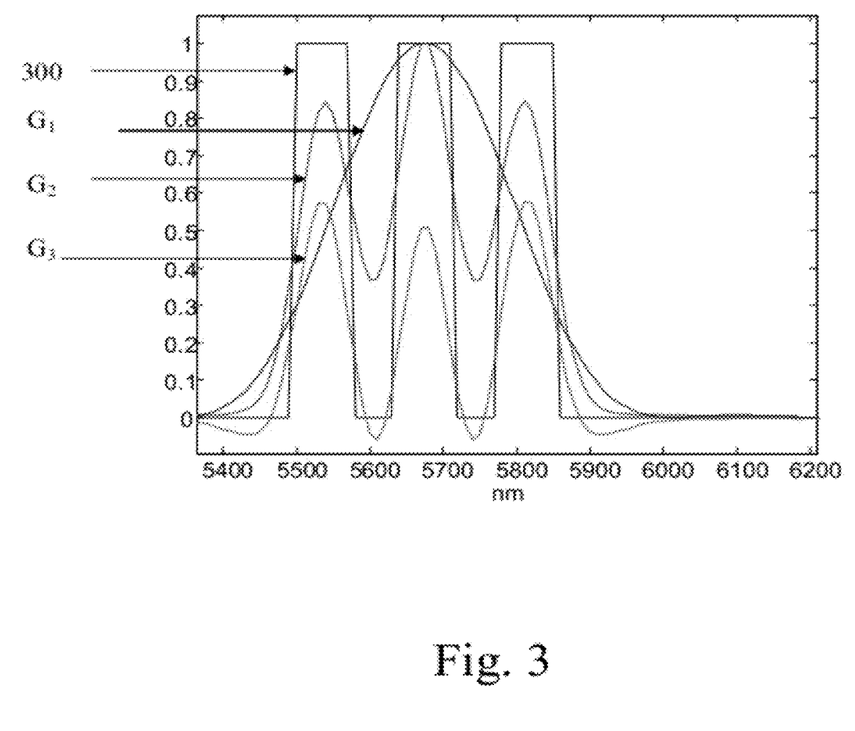
FIG. 3 illustrates the decoding of sub wavelength features using moving periodic structures attached to the scanned subject.

Reference is made to FIG. 3 showing simulation results for a sub wavelength structure 300 in which super resolution is achieved by moving spatial coding mask, configured as periodic coding functions having sub wavelength period (a grating in this specific example), close to the surface of an observed subject, at a distance of about 10 nm in this case.

The sub wavelength structure 300 having a period of 140 nm is illuminated at a wavelength of 500 nm. The structure 300 is shifted in front of the grating. The period of the grating is 250 nm and its fill factor is of 20%.

The calculated PSF of this imaging system is 500 nm i.e. its resolution is comparable to the optical wavelength. Curve $G_1$ represents structure 300 seen by the imaging system without the above described super resolution imaging. Curve $G_2$ represents structure 300 seen by the above described super resolution imaging system, and curve $G_3$ represents the processing results of curve $G_2$. It is evident that the super resolution imaging technique as described above provides for recovering the period of the structure 300 (140 nm), which is impossible with conventional imaging system (with no super resolution).

While this invention has been particularly shown and described with references to preferred embodiments thereof, it will be understood by those skilled in the art that various changes in form and details may be made therein without departing from the scope of the invention encompassed by the appended claims.

What is claimed is:

1. An imaging system for use in sub-wavelength super resolution imaging of a subject, the system comprising:

a spatial coding unit configured for collecting light coming from the scanned subject and being spaced from the subject a distance smaller than a wavelength range of said light;

a light detection unit located upstream of the spatial coding unit with respect to light propagation from the subject, and configured to define a pixel array and a spatial decoding unit, which is associated with said pixel array and is configured for applying spatial decoding to a magnified image of the scanned subject, thereby producing nanometric spatial resolution of the image.

2. The system of claim 1, comprising an imaging lens unit configured to provide certain magnification of a spatially coded image of the subject.

3. The system of claim 1, wherein the spatial coding unit is a patterned structure, the pattern being in the form of an array of spaced-apart light transmitting regions.

4. The system of claim 3, wherein the spatial coding unit comprises a fiber bundle formed by an array of light collecting fibers defining said array of spaced-apart light transmitting regions.

5. The system of claim 4, wherein the fiber bundle of the spatial coding unit comprises an array of illuminating fibers.

6. The system of claim 4, wherein said spatial coding unit is configured to image the subject with a predetermined magnification.

7. The system of claim 6, wherein the light transmitting region defined by each of the light collecting fibers has a cross sectional dimensional increasing from a distal end of the fiber by which it is brought to the subject towards a proximal end thereof.

8. The system of claim 7, wherein the cross sectional dimension of the transmitting region at the distal end of the fiber is in a range of about few nanometers to a few hundreds of nanometers.

9. The system of claim 8, wherein the decoding unit is in the form of a fiber bundle including an array of fibers extending by their proximal output ends towards the pixel array arrangement, the proximal output end of the decoding fiber bundle defining a decoding pattern in the form of spaced-apart light transmitting regions.

10. The system of claim 9, wherein the proximal end of the decoding fiber bundle is located substantially in the imaging plane.

11. The system of claim 9, wherein the pattern of the decoding unit presents the pattern of the coding unit at its distal end multiplied by the required image magnification.

12. The system of claim 8, comprising an imaging lens unit configured to provide certain magnification of a spatially coded image of the subject.

13. The system according to claim 12, wherein the imaging lens unit is attached to the proximal end of the coding fiber bundle.

14. The system of claim 12, wherein the decoding unit is in the form of a fiber bundle including an array of fibers extending by their proximal output ends towards the pixel array arrangement.

15. The system of claim 14, wherein the decoding fiber bundle extends from the imaging lens unit to the pixel array arrangement.

16. The system of claim 14, wherein the decoding fiber bundle extends from the imaging lens unit to the pixel array arrangement while defining a free space light propagation path between the imaging lens unit and the decoding fiber bundle.

17. The system of claim 3, wherein said pattern of the coding unit is a two- or three-dimensional pattern.

18. The system of claim 3, wherein the coding unit is in the form of a tapered fiber bundle defining a three-dimensional array of light transmitting regions.

19. The system of claim 18, wherein said tapered fiber bundle has a nano- or subnanoscale dimension at its distal end.

20. The system of claim 18, wherein the fibers of the coding unit include illuminating and light collecting fibers.

21. The system of claim 20, wherein said illuminating and light collecting fibers are arranged such that the arrangement of fibers at the distal end corresponds to the pattern of the spatial coding unit, and the arrangement of fibers at the proximal end forms the pattern of the decoding unit.

22. The system of claim 3, wherein a distance between two cores of adjacent fibers substantially does not exceed the wavelength of said light.

23. The system of claim 1, configured and operable for imaging the subject during a relative displacement between the coding and decoding units and the subject along an axis substantially perpendicular to an optical axis of the light propagation through the system, thereby enabling imaging of the scanned subject.

24. The system of claim 23, wherein the spatial decoding unit is a patterned surface located in front of the pixel array, the pattern being in the form of an array of spaced-apart light transmitting regions arranged in accordance with the image magnification.

25. The system of claim 1, configured and operable for imaging the subject during a relative displacement between the subject and the coding unit along an axis substantially perpendicular to an optical axis of the light propagation through the system, thereby enabling imaging of the scanned subject.

26. The system of claim 25, wherein the decoding unit is configured as a digital mask at the output of the pixel array.

27. The system of claim 26, wherein said decoding unit is configured and operable to produce a super-resolved image by performing digital processing on a temporal sequence of images collected from the subject.

28. The system of claim 27, wherein said decoding unit is configured and operable to perform processing of the output of the pixel array, said processing comprising applying certain spatial decoding to digital representation of each image in a sequence of successively acquired images during a certain period of time, obtaining digital coded data for each of the images, and integrating said coded data for said sequence of images.

29. The system of claim 1, wherein the decoding unit is located substantially in an imaging plane.

30. The system of claim 1, wherein each of said coding and decoding units is configured to concurrently generate a plurality of discrete light beams originated from the spaced-apart light transmitting regions spaced from one another a sub wavelength distance, thereby enabling formation of an image including a plurality of spatial sampling points.

31. The system of claim 30, configured and operable to reduce the scanning time of the subject by a factor proportional to the number of the spaced-apart light transmitting regions.

32. The system of claim 1, wherein said coding and decoding units is defined by input and output arrays of optical fibers, respectively.

33. The system of claim 32, wherein the input and output fiber arrays are spaced from each other in a manner allowing a free space light propagation from the input to the output fibers.

34. The system of claim 32, wherein said input and output fiber arrays are constituted by input and output ends of the fiber bundle.

35. The system of claim 34, wherein the input fibers are arranged to form the pattern of the spatial coding unit, and the output fibers are arranged to form the pattern of the spatial decoding unit.

36. The system of claim 1, wherein said spatial coding unit is configured to couple evanescent waves produced by reflection of illuminating light beams from the subject, and to allow the reflected light beams propagation towards the imaging lens unit.

37. The system of claim 1, configured for imaging moving subjects.

38. The system of claim 37, wherein said coding and decoding units are stationary mounted.

39. The system of claim 1, comprising a processor unit connectable to the output of the light detection unit and configured for processing data indicative of the image collected from the scanned subject and generating data indicative of the sub-wavelength features of the subject.

40. The system of claim 1, wherein said coding unit is configured as a pipette.

41. The system of claim 40, wherein said pipette is configured for penetrating through Subject's tissue.

42. The system of claim 1, comprising an illumination source configured and operable to illuminate the scanned subject.

43. The system of claim 42, wherein said illumination source is configured and operable to generate pulsed light.

44. A system for use in determination of one or more blood related parameters of a subject, the system comprising:
an optical imaging unit configured for producing sub-wavelength super resolution imaging of the flowing blood, and
a processor unit configured and operable for processing the sub-wavelength super resolution image and outputting data indicative of said one or more blood related parameters.

45. The system of claim 44, wherein said imaging unit comprises a spatial coding unit configured for collecting light coming from the flowing blood and being spaced from the blood vessel a distance smaller than a wavelength range of said light; an imaging lens unit configured to produce a predetermined magnification of the spatially coded image of the flowing blood; and a light detection unit configured to define a pixel array and a spatial decoding unit, which is associated with said pixel array and is configured for applying spatial decoding to the magnified image of the flowing blood, thereby producing nanometric spatial resolution of the image.

46. The system of claim 45, wherein the processor unit is configured and operable for calculating molecules of a certain substance of blood in the scanned subject and determining concentration of said substance in the subject's blood.

47. The system of claim 45, wherein the first spatial coding unit is configured as a pipette capable of penetrating the subject's tissue.

48. The system of claim 47, wherein said pipette comprises an array of optical fibers arranged in accordance with a spatial coding pattern.

49. An imaging method for sub-wavelength super resolution imaging of a subject, the method comprising:
while collecting light from the scanned subject, applying to said light a spatial coding at a distance from the subject smaller than a wavelength range of said light, such that the collection of the light is obtained due to tunneling of evanescent waves;
creating a sequence of magnified images of the subject from said collected coded light;
applying spatial decoding to signal indicative of the magnified coded image; and, processing digital data indicative of the spatially decoded light and generating data indicative of a nanometric spatial resolution image of the subject.

50. The method of claim 49, comprising generating from light coming from the subject a plurality of discrete light beams originated from the spatial coding unit, thereby enabling formation of an image including a plurality of spatial sampling points.

51. A method for use in determination of one or more blood related parameters of a subject, the method comprising:
- producing an optical sub-wavelength super resolution image of the scanned subject, and
- processing the sub-wavelength super resolution image and outputting data indicative of said one or more blood related parameters.

52. A method of claim 51 comprising:
- while collecting light coming from a blood vessel, applying to said light a spatial coding at a distance from the blood vessel smaller than a wavelength range of said light such that the collection of the light is obtained due to tunneling of evanescent waves;
- creating a magnified image of the sub-wavelength features of the blood stream from said collected coded light;
- while detecting light indicative of the magnified image, applying to the detected light spatial decoding; and,
- processing digital data indicative of the spatially coded light and generating data indicative of a nanometric spatial resolution image of the blood stream.

53. The method of claim 51, wherein one or more blood related parameters comprises chemical components within the blood stream.

54. The method of claim 51, wherein said chemical components include glucose.

55. The method of claim 51, comprising identifying and counting glucose molecules.

* * * * *